United States Patent

[11] 3,568,194

| [72] | Inventors | Robert G. Wilson<br>Riverside, Calif.;<br>Gordon L. Burton, Acton, Mass.; Edward<br>N. Skomal, Redlands, Calif. |
|---|---|---|
| [21] | Appl. No. | 675,278 |
| [22] | Filed | Oct. 11, 1967 |
| [45] | Patented | Mar. 2, 1971 |
| [73] | Assignee | the United States of America as represented by the Secretary of the Air Force |

[54] SYSTEM FOR DEGRADING RADAR RETURN SIGNALS
1 Claim, 1 Drawing Fig.

| [52] | U.S. Cl. | 343/18 |
|---|---|---|
| [51] | Int. Cl. | G01s 7/42 |
| [50] | Field of Search | 343/18 (D), 18 (E) |

[56] References Cited
UNITED STATES PATENTS

| 2,443,643 | 6/1948 | Schelleng | 343/18UX |
| 3,102,243 | 8/1963 | Zaleski | 343/18UX |
| 3,108,275 | 10/1963 | Chisholm | 343/18 |
| 3,154,784 | 10/1964 | Allen | 343/18 |
| 3,305,863 | 2/1967 | Jacobs | 343/18 |

Primary Examiner—Rodney D. Bennett, Jr
Assistant Examiner—Malcolm F. Hubler
Attorneys—Herbert A. Herbert, Jr and George Fine ABSTRACT: A method and system for degrading the performance of radars that track satellites, reentry vehicles and the like. The method and system comprises phase and/or amplitude modulation of the radar signal by one or more "scattering" sources positioned on the target vehicle, thus causing the return target signal to appear as an incoherent object. Scattering sources suitable for appropriate modulation include antenna reflectors connected to variable load transmission lines.

PATENTED MAR 2 1971  3,568,194
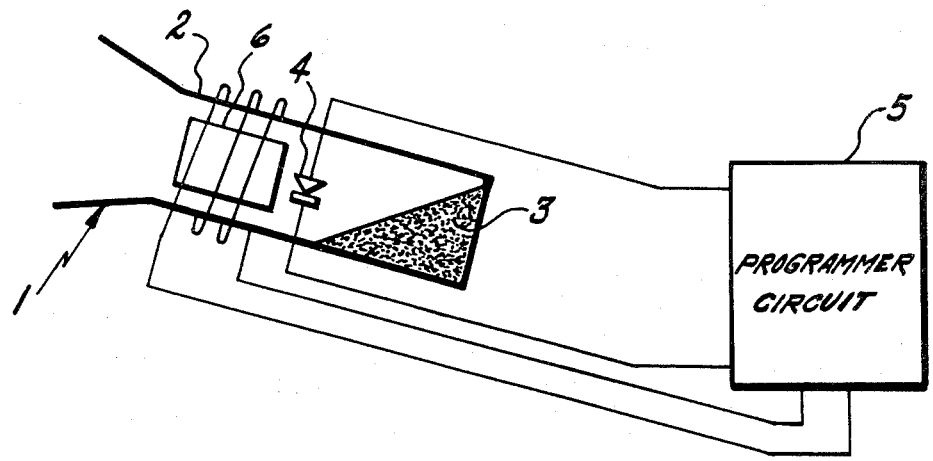
INVENTORS
ROBERT G. WILSON
GORDON L. BURTON
EDWARD N. SKOMAL
BY Harry A. Herbert Jr
George Fine
ATTORNEYS

SYSTEM FOR DEGRADING RADAR RETURN SIGNALS

This invention relates to a method and system for degrading radar return signals and more particularly the method and system wherein target vehicles include radar scattering sources with the scattering sources phase and/or amplitude modulated so that radar signals returned thereby appear incoherent.

The present invention provides a method and system to seriously degrade the performance of advanced active sensors (including multistatic) which utilize long duration waveforms. More specifically, the performance degradations include: 1. Rapid estimations of target parameters such as velocity, acceleration, and weight-to-drag ratio can be prevented. 2. Signature data such as target scintillations can be masked. 3. The range resolution and precision achieved by large time-bandwidth product waveforms can be seriously degraded. 4. Realizable subclutter visibility of the sensor is reduced.

This method is applicable to a variety of vehicles including but not necessarily limited to reentry vehicles, decoys, and satellites. It is based on the fact that wide variety of sensor measurements assume one of the following postulates: 1. That the target is well behaved in the sense that the waveforms scattered by the target are not significantly dispersed relative to the incident waveforms. 2. That the target is well behaved in the sense that the phase and amplitude of a scattered vector is correlated with the geometry and dynamics of the ensemble of the scatterers that constitute the target.

This method is comprised of phase and/or amplitude modulation of one or more of the scattering sources of mechanisms associated with a vehicle. The target is thus made to appear as an incoherent object in a synthetic manner. The modulation can variously be applied to shape, energy absorption materials, and scatterer impedances. The modulation can be applied to new scatterers such as antenna elements specifically added to ease implementation of the technique. The modulation can also be applied to scattering elements added to reduce ro enhance the backscatter such as cavity-backed slots.

If a noiselike modulation with adequate bandwidth is applied to a principal scattering source, the target return cannot be coherently processed effectively. Modulation with more slowly varying noise will mask natural scintillation as observed over a pulse train incoherently processed.

If a sinusoidal modulation is applied, a low velocity object can be made to simulate a high-velocity object when the sensor derives Doppler information. Sinusoidal modulations can also be applied to simulate vehicle dynamics such as precession and nutation rates.

The modulating element can assume a wide variety of forms including diodes and ferrites. Devices such as tunnel diodes which exhibit negative resistance can be employed to enhance the modulated return or to compensate for losses. Such losses include those resulting from delays introduced to simulate a train of targets.

The principal prior art to the synthetic incoherency technique are barrage and repeater jammers. The synthetic incoherency technique is unique in the following senses. The power requirements can be as much as six orders of magnitude less that that required for an equivalent jammer. The size can be very much less. The weight will be negligible. The reliability will be very high since components will be few, circuits and mechanisms very simple, and operation noncritical in regard to performance parameters.

An object of the present invention is to provide a method and system for degrading radar return signals from a target vehicle.

Another object of the present invention is to provide a method and system for degrading radar return signals from a target vehicle including scattering sources by phase and/or amplitude modulating the scattering sources thus operating to cause the radar signals returned thereby to appear incoherent.

The various feqtures of novelty which characterize this invention are pointed out with particularity in the claims annexed to and forming a part of this specification. For a better understanding of the invention, however, its advantages and specific objects obtained with its use, reference should be had to the accompanying drawing and descriptive matter in which is illustrated and described a preferred embodiment of the invention.

Now referring to the single drawing, there is shown an embodiment of the present invention which is positioned in a reentry target vehicle. This invention is applicable to a variety of target vehicles including but not necessarily limited to reentry vehicles, decoys, satellites.

There is shown an antenna in the form of horn 1. The antenna may be any of many types compatible with the environment to be tolerated by the target vehicle. Horn 1 is coupled to waveguide 2. Other types of transmission line may be used. Waveguide 2 terminates in absorbing wedge 3 such that electromagnetic energy directed towards the target vehicle by a search radar is essentially completely absorbed, if it gets that far. Between absorbing wedge 3 and horn 1 is diode 4. By varying the bias of diode 4, which is positioned in waveguide 21 its reflectivity can vary so that some of the electromagnetic energy instead of being absorbed by wedge 3 will be reflected back out of horn 1. Thus, the amplitude of energy reflected can be varied by programmer circuit 5 which controls the diode bias. Programmer circuit may be an off the shelf type of component which merely alters the bias voltage of the diode in accordance with a prearranged voltage varying pattern.

In addition to diode 4, waveguide 2 contains ferrite phase shifter 6 which is also controlled over a wide range by programmer circuit 5. The phase rate, and so the apparent velocity of horn 1 can also be controlled in this manner. Thus, the reflectivity of an antenna is changed by modifying the phase shift and/or attenuation in a transmission line which loads the antenna.

There are, of course, other methods of changing the phase and phase rate of the transmission line. For example, solid state delay lines could be used and switched to produce changes in jumps or smoothly by proper use of attenuators and mixing of signals.

The cross section of the antenna of this invention may be somewhat greater than the cross section of the target vehicle. The resultant return signal at the search radar will be the vector sum of the return from the vehicle and the antenna. The best location for the antenna is as near the scattering center of the vehicle as possible, if there is only one center. If several search radars with transmissions of different spectra are to be confused, several separate systems as shown in the single drawing may be used.

Shape is one of the most difficult properties of the target vehicle to determine. Some concepts have been described for this application such as fine frequency and wideband length measurement. Such methods depend on determining the scattering from two points on the target vehicle, usually the nose and the base. In sharp-pointed vehicles, the cross section of the nose is many db below that of the base. In blunt vehicles, the two cross sections will be more nearly equal. The system of the present invention to confuse such discriminating methods has only to present a nose cross section of the desired amplitude relative to the base.

The variation of absorption has been described heretofore. It should be noted that the cross section of the apparatus of the present invention can be varied over a considerable range by varying its absorption properties. It is also to be noted that impedance, as referred to in the specification, is comprised of the phase shift characteristics of the scatterer. The controlled phase-shifter thus controls the impedance of the present system.

It will be understood that certain features and subcombinations are of utility and may be employed without reference to other features and subcombinations. This is contemplated by and within the scope of the claims. It is further obvious that various changes may be made in detail within the scope of the claims without departing from the spirit of the invention. It is,

We claim:

1. A system for degrading the performance of a search radar tracking a reentry target vehicle such as a satellite comprising antenna means receiving pulses from said search radar, a transmission line connected to and loading said antenna means, a diode disposed in said transmission line, ferrite phase shifting means also disposed in said transmission line programming means connected to said diode and said phase shifting means to vary the bias of said diode in accordance with a prearranged voltage pattern to control the amplitude of the reflected signals from said antenna means and simultaneously vary said phase shifting means also in accordance with a predetermined pattern to correspondingly vary the phase and phase rate and thus the apparent velocity of said antenna means, and absorption means also disposed in and terminating said transmission line, said absorption means completely absorbing all the energy of said search radar pulses arriving thereat.